A. D. CURRY.
NUT LOCK.
APPLICATION FILED NOV. 26, 1915.

1,202,678.

Patented Oct. 24, 1916.

Witnesses
C. M. Beall.
Robt. Meyer.

Inventor
A. D. Curry.
By _____
Attorney

UNITED STATES PATENT OFFICE.

ALEXANDER D. CURRY, OF HAWKINSVILLE, GEORGIA.

NUT-LOCK.

1,202,678.  Specification of Letters Patent.  Patented Oct. 24, 1916.

Application filed November 26, 1915. Serial No. 63,653.

*To all whom it may concern:*

Be it known that I, ALEXANDER D. CURRY, a citizen of the United States, residing at Hawkinsville, in the county of Pulaski and State of Georgia, have invented certain new and useful Improvements in Nut-Locks; and I do hereby declare the following to be a full, clear, and exact description of the invention, such as will enable others skilled in the art to which it appertains to make and use the same.

This invention relates to nut locks, and the primary object of the invention is to provide a nut lock which is comparatively simple in construction and which includes a set screw constructed of machine steel, which is adjustably seated in the nut, and which set screw has a bit formed upon its inner end for drilling a seat in the bolt upon which the nut is mounted.

Another object of this invention is to provide a nut and set screw as specified which are provided with alining grooves and to mount a wire within said grooves for holding said set screw against accidental rotation within said nut.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1:
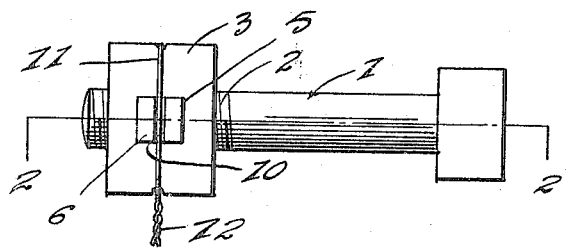
Figure 2:
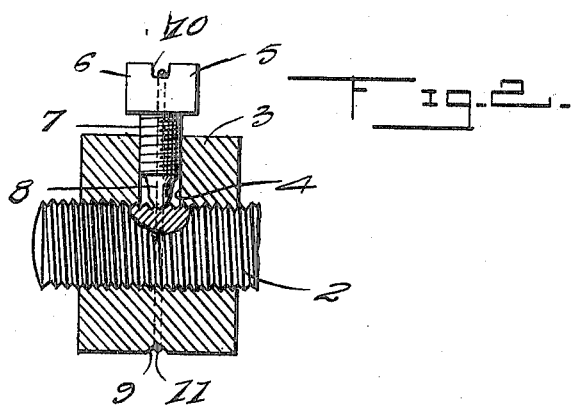
Figure 3:
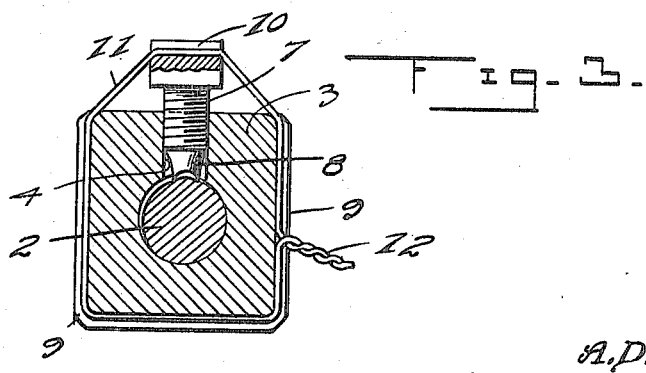

Figure 1 is a side elevation of the improved nut lock. Fig. 2 is a longitudinal section through the nut showing the screw threaded shank of the bolt and the set screw in side elevation, and Fig. 3 is a cross sectional view through the improved nut lock showing the shank of the set screw in elevation and the head of the same in section.

Referring more particularly to the drawings, 1 designates an ordinary bolt of any ordinary construction having a screw threaded shank 2, and 3 designates the nut which is mounted upon the screw threaded shank 2 of the bolt.

The nut 3 is provided with an internally screw threaded transversely extending opening 4, which communicates with the longitudinal bore of the nut. The opening 4 is provided for adjustably receiving a set screw 5. The set screw 5 is constructed of machine steel, and is provided with a head 6 and an externally screw threaded shank 7. The end of the shank 7 is reduced, and shaped for forming a drill bit as is shown at 8, which will, upon the rotation of the set screw, and the inward movement of the set screw cut a seat in the screw threaded shank 2 of the bolt 1, for preventing the rotation of the nut 3 upon the shank 2. The reducing of the end of the shank 7, as shown at 8, will provide sufficient space within the opening 4 for receiving the shavings cut from the shank 2 by the bit 8 during the formation of the seat for the end of the set screw within the shank 2. The nut 3 is provided with a groove 9 which extends about three sides of the same. A groove 10 is formed in the head 6 of the set screw 5, and alines with the groove 9. A wire is positioned within the grooves 9 and 10 and it has its ends twisted as is shown at 12 in Figs. 1 and 3 of the drawing for preventing the accidental rotation of the set screw.

When the set screw 6 is adjusted inwardly within the opening 4, the bit end 8 of the same will drill a seat in the shank 2 of the bolt 1, and prevent the accidental rotation of the bolt or nut 3 with respect to each other. The wire 11 which is seated in the grooves 9 and 10 will prevent the accidental rotation of the set screw 6.

In reducing the invention to practice certain minor features of construction, combination and arrangement of parts may necessitate alterations to which the patentee is entitled provided such alterations are comprehended within the scope of what is claimed.

What is claimed is:—

In a nut lock structure, the combination with a bolt of ordinary construction, and a nut for mounting upon said bolt, said nut being provided with a transversely extending opening formed therein, of a set screw constructed of machine steel and having a drill bit formed upon its inner end for cutting a seat within said bolt for preventing accidental rotation of said nut with respect to said bolt, said nut being provided with a groove formed in three sides of the same, the head of said set screw being provided with a groove alining with the grooves formed in said nut, and a wire positioned within said grooves and having its ends twisted together for preventing accidental rotation of said set screw within said opening.

In testimony whereof I affix my signature in presence of two witnesses.

ALEXANDER D. CURRY.

Witnesses:
L. C. RYAN,
L. M. McEACHERN.

Copies of this patent may be obtained for five cents each, by addressing the "Commissioner of Patents, Washington, D. C."